UNITED STATES PATENT OFFICE.

ANTON LEDERER, OF VIENNA, AUSTRIA-HUNGARY, ASSIGNOR TO WESTINGHOUSE LAMP COMPANY, A CORPORATION OF PENNSYLVANIA.

PROCESS OF MANUFACTURE OF TUNGSTEN DIOXID.

984,143. Specification of Letters Patent. Patented Feb. 14, 1911.

No Drawing. Application filed September 6, 1907. Serial No. 391,662.

*To all whom it may concern:*

Be it known that I, ANTON LEDERER, a subject of the Emperor of Austria-Hungary, and a resident of Vienna, Austria-Hungary, have invented a new and useful Improvement in Processes of Manufacture of Tungsten Dioxid, of which the following is a specification.

The present invention relates to a process of obtaining tungsten dioxid.

The process consists in mixing with tungsten trioxid an aliphatic hydroxyl compound, such as glycerin, ethylene glycol, or the like, preferably in the proportions of about ten parts by weight of tungstic acid to about one-half a part by weight of glycerin, ethylene glycol, or other equivalent substance. The mass should be intimately mixed and this can be effected by adding to the glycerin, ethylene glycol or the like, water or some other suitable fluid which will aid in producing a uniform distribution of the reducing medium throughout the tungstic acid. The drying process may be carried on at the temperature at which the diluting material evaporates, but should be below the decomposing temperature of glycerin or the like. The glycerin or other equivalent substance may be mixed with the solvent in undiluted form under constant stirring. The mass is then slowly dried, the result being that the diluent alone evaporates. The mixture thus obtained is heated to red heat, preferably in a non-oxidizing atmosphere, for a considerable time (about 2–5 hours) according to the amount of material used and the temperature. When this process is properly carried out the brown dioxid of tungsten ready for use is obtained after cooling takes place.

Instead of the trioxid of tungsten or the tungstic acid, it is possible to treat intermediate oxids of tungsten in a similar manner and obtain the same results.

In carrying out the described process it is of great importance that care should be taken that the materials used are perfectly free from alkaline substances.

I claim as my invention:—

1. The method of manufacturing tungsten dioxid from the higher oxids of tungsten, which consists in intimately mixing the same with a proper proportion of aliphatic hydroxyl compound, and then subjecting the mixture to a high temperature in a non-oxidizing atmosphere.

2. The method of manufacturing tungsten dioxid from higher oxygen compounds of tungsten, which consists in intimately mixing with the same a proper proportion of aliphatic hydroxyl compound such as described, adding to the mixture a volatile liquid lighter than the reducing medium, mixing thoroughly, drying the completed mixture so as to evaporate the volatile medium, and subjecting the resulting product to a high temperature in a non-oxidizing atmosphere.

3. The method of manufacturing tungsten dioxid from a higher oxygen compound of tungsten, which consists in taking the oxygen compound and a reducing medium such as described, adding a diluting liquid, intimately mixing the same and evaporating the diluting medium, and subjecting the resulting product to a high temperature.

4. The method of manufacturing tungsten dioxid from the higher oxids of tungsten, which consists in intimately mixing the latter with a proper proportion of glycerin and then subjecting the mixture to a high temperature.

In testimony whereof I have hereunto subscribed my name this 10th day of August 1907.

ANTON LEDERER.

Witnesses:
 SIEGFRIED NEUTEN,
 ROBT. W. HEINGARTNER.